United States Patent Office 3,422,142
Patented Jan. 14, 1969

3,422,142
IMINES AND PRODUCTION THEREOF
Ernest A. Zuech, Bartlesville, Okla., assignor to Phillips
Petroleum Company, a corporation of Delaware
No Drawing. Filed Jan. 29, 1965, Ser. No. 429,117
U.S. Cl. 260—566                                    9 Claims
Int. Cl. C07b 29/00; C07c 119/00

ABSTRACT OF THE DISCLOSURE

Imines are converted to higher molecular weight imines by reaction with a butadiene in the presence of an alkali metal amide. The initial imine must have at least one alpha hydrogen. The new imine will contain at least one 2-butenyl group in place of an alpha hydrogen in the original imine.

---

This invention relates to a new method for the production of certain imines and aldehydes. In a further aspect, the invention relates to new chemical compounds.

An object of this invention is to provide a process for the production of imines. A further object of the invention is to provide a process for the production of aldehydes. Other objects and advantages of the invention will be apparent to one skilled in the art upon reading this disclosure.

Broadly, one aspect of the invention resides in a process comprising contacting a mixture of 1,3-butadiene and an imine of the formula $$R_1-N=C(R_2)-C(R_2)_2-H$$

where $R_1$ is selected from the group consisting of 1 to 20 carbon alkyl radicals and each $R_2$ is individually selected from the group consisting of hydrogen and 1 to 20 carbon alkyl radicals with an alkali metal amide catalyst thereby forming a reaction product, and recovering a reaction product comprising an imine containing at least one 2-butenyl group in place of an alpha hydrogen in the original imine. An "alpha" hydrogen is one attached to the carbon atom next to the carbon atom doubly bonded to the nitrogen. Hydrolysis of the imine produces the corresponding aldehyde.

In another aspect, the invention provides, as a new composition of matter, an imine of the formula

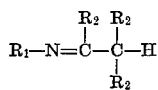

where $R_1$ is selected from the group consisting of 1 to 20 carbon alkyl radicals, $R_2$ is selected from the group consisting of hydrogen and 1–20 carbon alkyl radicals, and each $R_3$ is selected from the group consisting of hydrogen, 2-butenyl, and 1–20 carbon alkyl radicals.

In yet another aspect, the invention provides, as a new composition of matter, a compound of the formula

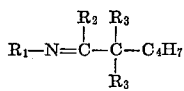

where $R_2$ is seelcted from the group consisting of hydrogen and 1–20 carbon alkyl radicals, and each $R_3$ is selected from the group consisting of hydrogen 2-butenyl, and 1–20 carbon alkyl radicals.

The process of this invention is best described by the following equations.

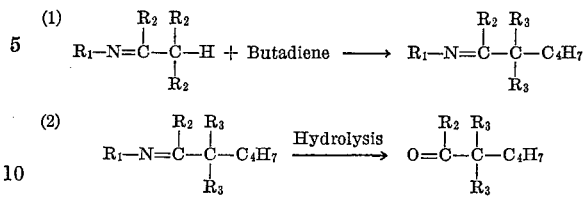

wherein $R_1$, $R_2$, and $R_3$ are as defined previously. Thus, if in the starting imine the $R_2$ groups are alkyls, they will not be replaced with butenyl groups and the $R_3$ will be of the same scope. If the $R_2$'s were hydrogen, they can be butenyl groups.

From these equations, it is apparent that the imine used as the starting material for the first step of the process is on which contains at least one alpha hydrogen. Specific examples include N-propyl-butylidenimine, N-tert-butyl-heptylidenimine, N-tert-butylethylidenimine, N-tert-butylbutylidenimine, N-methylethylidenimine, N-ethylpropylidenimine, N - pentyl-4-methyloctylidenimine, N-eicosyldecylidenimine, and N-methyl-2-heptyldocosylidenimine. From these examples of the starting materials which can be used in the process, it is evident that they can contain up to a total of 30 carbon atoms. Also, it can be seen from reaction (1) above that when a compound like N-eicosyldecylidenimine is used as the starting compound, the imine produced can have up to a total of 38 carbon atoms.

The active catalyst in the process of this invention is an alkali metal amide, including the amides of sodium, potassium, lithium, rubidium, and cesium. This catalyst can be charged to the reaction zone as the alkali metal amide, or it can be formed in situ by charging a free alkali metal, an alkali metal hydride or an organo alkali metal to the reaction zone along with ammonia or an amine which will react with an alkali metal source to form the amide. The imine reactant can, under some circumstances, react to form an amide-type compound, but it is preferred to charge ammonia or an amine to the reaction zone along with the alkali metal source to form the catalyst in situ. Typical materials which can be charged to the reaction zone for in stiu production of the active catalyst are the above-listed alkali metals, the hydrides of these metals and such organometal compounds as phenylsodium, amylpotassium, butyllithium, and the like. Along with these alkali metals or alkali metal compounds, ammonia or a primary or secondary amine can be charged. A suitable amine includes such materials as methylamine, dimethylamine, ethylamine, diethylamine and other amines which will react with alkali metals or alkali metal hydrides to form amides.

The amount of catalyst employed will generally range from 0.025 to 0.5 mole of alkali metal amide per mole of imine reactant. The mole ratio of butadiene to imine reactant will generally range from 1/1 to 3/1, although higher ratios can be employed if desired. When forming the alkali metal amide catalyst in situ, it is preferred to charge ammonia or an amine in a mole ratio of 1 to 2 moles of ammonia or amine per mole of alkali metal source used.

The reaction of butadiene with an imine according to the process of this invention is caried out at a temperature generally ranging from 30 to 150° C., preferably from 50 to 120° C., with reaction times generally ranging from a few minutes to several hours. The process is usually effected at autogenous pressure, but higher pressure can be employed. The reaction is carried out batchwise or continuously.

If desired, the reaction can be effected in the presence of a diluent, although it is preferred to operate in the absence of such materials. Suitable diluents include polar solvents which are not reactive with imines, as for example, diethyl ether, dioxane, tetrahydrofuran and the like.

Following the reaction of butadiene with an imine, the reaction mixture is preferably treated to deactivate the alkali metal amide catalyst remaining prior to hydrolysis. Suitable catalyst deactivators include water, methanol and the like.

The hydrolysis of the reaction mixture is effected by contacting the reaction mixture with a 5 to 20 weight percent aqueous solution of a mineral acid such as hydrochloric or sulfuric acid. If the catalyst has not been previously deactivated, it will be deactivated by the acid addition. The amount of acid employed should be sufficient to provide an excess over and above that required for formation of salts of the imines. The hydrolysis is generally carried out at a temperature of from 25° C. up to the reflux temperature of the hydrolysis mixture.

One particularly convenient method for effecting simultaneous hydrolysis and separation of the aldehyde product is to subject the hydrolysis mixture to steam distillation. The aldehyde product can be recovered from the steam distillate by conventional separation methods and vacuum distillation.

As a further important feature of this invention, the hydrolysis to yield an aldehyde also yields 1 mole of amine per mole of aldehyde produced. This amine can be recycled for reaction with a carbonyl compound in conventional manner to reform an imine which can then be employed in the present process.

The principal feature of the present process is that it allows one to manufacture a wide variety of aldehydes, and to choose the molecular weight of aldehyde desired within a certain range. Referring to the equations shown above, it is clear from Equation 1 that one can form an imine through butadiene reaction which has a desired number of carbon atoms, and that hydrolysis will yield an aldehyde of the desired number of carbon atoms. For example, if one desires a $C_{12}$ aldehyde, one can start with an N-alkylbutylidenimine such as N-propylbutylidenimine, while if one desires a $C_{15}$ aldehyde, he can employ an N-alkylheptylidenimine such as N-tert-butylheptylidenimine. It should be obvious to those skilled in the art that by proper choice of starting material one can produce a wide variety of aldehyde products.

The aldehyde products in this process can be hydrogenated to alcohols which find utility as solvents, or the alcohols can then be employed in the production of esters which are useful as plasticizers, lubricants, and the like. Because of good high temperature stability, these esters are quite useful for these purposes. Sulfonation of the alcohols produces products with detergent properties.

The following specific examples are intended to illustrate the advantages of the process of this invention, but it is not intended to limit the invention to the particular features of these examples.

Example I

A run was carried out in which N-propylbutylidenimine was reacted with butadiene, following which the reaction mixture was hydrolized.

In this run, 53.9 grams (0.477 mol) N-propylbutylidenimine, 5 grams of NaH, 5 grams of $NH_3$ and 138 grams (2.55 mol) of butadiene were charged to an autoclave and heated to 75–80° C. for 1 hour and 45 minutes. The reaction mixture was then cooled, vented and MeOH and water were added to the mixture to deactivate the catalyst. The mixture was then extracted with a mixture of pentane and ether, and the organic layer was separated and dried over $CaSO_4$. After stripping of the solvent, 107 grams of imine product was obtained. This material was admixed with 250 ml. of 5 percent aqueous HCl and steam distilled. This yielded 61.9 grams of $C_{12}$ aldehyde.

Infrared analysis showed this aldehyde to be identical to that produced by the reaction of butadiene and methylamine in the presence of a sodium amide catalyts followed by hydrolysis of the imine product. Such a process is disclosed and claimed in a copending disclosure of the present inventor, Mahan, and Kleinschmidt, Ser. No. 429,127. Nuclear magnetic resonance of this aldehyde confirmed the structure to be

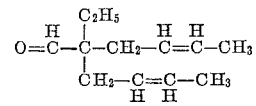

Thus, the N-propyl-2-ethyl-2-(2-butenyl)-4-hexenylidenimine products was hydrolized to 2-ethyl-2-(2-butenyl)-4-hexenal.

Example II

A run was carried out by the procedure of Example I except that N-tert-butylheptylidenimine was used.

In this run, the autoclave of Example I was charged with 88 grams (0.521 mol) of N-tert-butylheptylidenimine, 5 grams of $NH_3$, 5 grams of NaH, and 118 grams of butadiene and heated to 80° C. for 4 hours. The initial product was worked up by the procedure of Example I, after which it was mixed with 150 ml. of concentrated HCl and 750 ml. of water and steam distilled. Vacuum distillation of the steam distillate yielded 64 grams of a $C_{15}$ aldehyde and 20.7 grams of a $C_{11}$ aldehyde.

Infrared and nuclear magnetic resonance analyses indicated the presence of 2,2-di(2-butenyl)heptanal and 2-(2-butenyl)heptanal.

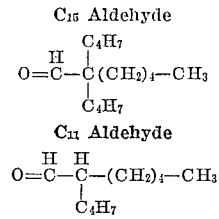

Elemental analyses of these products gave the following results:

Calculated wt. percent for $C_{15}H_{26}O$: C, 81.0; H, 11.8. Found, wt. percent: C, 81.1, 81.0; H, 12.0, 11.9.

Calculated wt. percent for $C_{11}H_{20}O$: C, 78.5; H, 12.0. Found, wt. percent: C, 78.3, 78.3; H, 11.9, 12.0.

Example III

The procedure of Examples I and II was used in another run, except that N-tert-butylethylidenimine was used.

The autoclave was charged in this run with 57 grams (0.576 mol) of N-tert-butyltethylidenimine, 175 grams (3.2 mol) of butadiene, 5 grams of NaH and 5 grams of $NH_3$. The mixture was heated to 80° C. for 4 hours and 8 minutes, following which it was worked up as in Examples I and II. The initial product was mixed with 125 ml. of concentrated HCl and 600 ml. of $H_2O$ and steam distilled. Vacuum distillation of the steam distillate yielded 87.9 grams of a $C_{14}$ aldehyde.

Elemental analysis of this aldehyde gave the following results:

Calculated for $C_{14}H_{22}O$ wt. percent: C, 81.5; H, 10.8. Found, wt. percent: C, 81.5, 81.5; H, 10.9, 11.0.

Analysis by infrared and nuclear magnetic resonance indicated that this aldehyde was 2,2-di(2-butenyl)-6-hexenal.

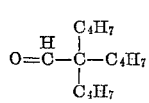

The dinitrophenylhydrazine derivative of this aldehyde was prepared by the reaction of 2 ml. of the aldehyde and 1.5 grams of 2,4-dinitrophenyl-hydrazine. Recrystallization of the precipitate from ethanol yielded fine, gold-colored needles, melting at 146.5 to 149° C.

Example IV

A run was carried out by the procedure of Example I except that N-tert-butylbutylidenimine was utilized.

In this run, the procedure of the preceding examples was employed, and 61.0 grams (0.48 mol) N-tert-butylbutylidenimine, 137 grams butadiene, 5 grams NaH and 5 grams of NH₃ was charged to the autoclave of Example I. The mixture was heated to 80° C. for 3 hours, after which it was worked up as before to yield 108.2 grams of product. Distillation of 25 grams of this product yielded 3.2 grams of $C_{12}$ imine and 18.3 grams of a $C_{16}$ imine. Elemental analyses of these materials gave the following results:

Calculated wt. percent for $C_{12}H_{23}N$: C, 79.5; H, 12.8; N, 7.7. Found, wt. percent: C, 78.9, 79.2; H, 12.8, 13.0; N, 7.8.

Calculated wt. percent for $C_{16}H_{29}N$: C, 81.6; H, 12.4; N, 6.0. Found, wt. percent: C, 81.5, 81.5; H, 12.4, 12.5; N, 6.4, 6.5.

Hydrolysis of a portion of the $C_{16}H_{29}N$ imine by treatment with aqueous acid and steam distillation as in the previous examples yielded the $C_{12}$ aldehyde of Example I, 2-ethyl-2-(2-butenyl)-4-hexenal. Similar hydrolysis of the $C_{12}H_{23}N$ imine yielded 2-ethyl-4-hexenal.

As many possible embodiments can be made of this invention without departing from the scope thereof, it is to be understood that all matter herein set forth is to be interpreted as illustrative and not as unduly limiting the invention.

What is claimed is:

1. An imine of the formula

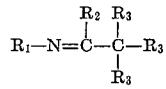

where $R_1$ is selected from the group consisting of alkyl radicals having 1 to 20 carbon atoms, $R_2$ is selected from the group consisting of hydrogen and alkyl radicals having 1 to 20 carbon atoms, and each $R_3$ is selected from the group consisting of hydrogen, 2-butenyl, and alkyl radicals having 1 to 20 carbon atoms, at least one $R_3$ being 2-butenyl and the total number of carbon atoms in said imine being 38 or less.

2. An imine selected from the group consisting of N-propyl-2-ethyl-2-(2-butenyl) - 4-hexenylidenimine, N-tert-butyl-2-(2-butenyl)-heptylidenimine, N-tert-butyl-2,2-di(2-butenyl), heptylidenimine, N-tert-butyl - 2,2-di(2-butenyl)-4-hexenylidenimine, N - tert-butyl - 2 - ethyl - 4 - hexenylidenimine and N-tert-butyl-2-ethyl-2-(2-butenyl-4-hexenylidenimine.

3. A process comprising reacting a mixture of 1,3-butadiene and an imine of the formula

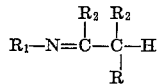

where $R_1$ is selected from the group consisting of alkyl radicals having 1 to 20 carbon atoms, each $R_2$ is individually selected from the group consisting of hydrogen and alkyl radicals having 1 to 20 carbon atoms and the total number of carbon atoms in said imine is 30 or less, with an alkali metal amide catalyst, and recovering an imine containing at least one 2-butenyl group in place of an alpha hydrogen in the original imine.

4. The process according to claim 3 wherein said imine is selected from the group consisting of N-propyl-butylidenimine, N-tert-butylheptylidenimine, N-tert-butylethylidenimine, N-tert-butylbutylidenimine, N-methylethylidenimine, N-ethylpropylidenimine, N-pentyl-4-methyloctylidenimine, N-eicosyldecylidenimine, and N-methyl-2-heptyldocosylidenimine.

5. The process of claim 3 wherein the mole ratio of 1,3-butadiene to imine is from 1/1 to 3/1, the mole ratio of catalyst to imine is 0.025/1 to 0.5/1, the process is carried out at a temperature of 30 to 150° C. for a time up to several hours, and the catalyst is deactivated by adding a material selected from the group consisiting of water and lower alcohols.

6. A process comprising reacting a mixture of N-propyl-butylidenimine and 1,3-butadiene with an alkali metal amide catalyst which forms on adding to the mixture sodium hydride and ammonia, heating said mixtue to 75–80° C., adding methyl alcohol and water to deactivate the catalyst, and recovering N-propyl-2-ethyl-2-(2-butenyl)-4-hexenylidenimine from the reaction product.

7. A process comprising reacting a mixture of N-tert-butylheptylidenimine and 1,3-butadiene with an alkali metal amide catalyst which forms on adding to the mixture sodium hydride and ammonia, heating said mixture to 80° C., adding methyl alcohol and water to deactivate the catalyst, and recovering N-tert-butyl-2-(2-butenyl) heptylidenimine and N-tert-butyl-2,2-di-(2-butenyl)heptylidenimine, from the reaction product.

8. A process comprising reacting a mixture of N-tert-butylethylidenimine and 1,3-butadiene with an alkali metal amide catalyst which forms on adding to the mixture sodium hydride and ammonia, heating said mixture to 80° C., adding methyl alcohol and water to deactivate the catalyst and recovering N-tert-butyl-2,2-di(2-butenyl)-4-hexenylidenimine from the reaction product.

9. A process comprising reacting a mixture of N-tert-butylbutylidenimine and 1,3-butadiene with an alkali metal amide catalyst which forms on adding to the mixture sodium hydride and ammonia, heating said mixture to 80° C., adding methyl alcohol and water to deactivate the catalyst, and recovering N-tert-butyl-2-ethyl-4-hexenylidenimine and N-tert-butyl-2-ethyl-2-(2-butenyl)-4-hexenylidenimine from the reaction product.

References Cited

UNITED STATES PATENTS 3,230,216    1/1966   Stork _____ 260—566 XR

CHARLES B. PARKER, *Primary Examiner.*

R. V. HINES, *Assistant Examiner.*

U.S. Cl. X.R.

260, 593, 638, 601.